United States Patent
Sakazaki et al.

(10) Patent No.: US 7,490,862 B2
(45) Date of Patent: Feb. 17, 2009

(54) HOLDING STRUCTURE OF HOSE CLAMP

(75) Inventors: Kazushige Sakazaki, Komaki (JP); Koji Hioki, Ichinomiya (JP)

(73) Assignee: Tokai Rubber Industries, Ltd. (JP)

( * ) Notice: Subject to any disclaimer, the term of this patent is extended or adjusted under 35 U.S.C. 154(b) by 387 days.

(21) Appl. No.: 11/358,702

(22) Filed: Feb. 21, 2006

(65) Prior Publication Data

US 2006/0186668 A1 Aug. 24, 2006

(30) Foreign Application Priority Data

Feb. 23, 2005 (JP) ............................. 2005-046403

(51) Int. Cl.
*F16L 33/00* (2006.01)
(52) U.S. Cl. .................... 285/23; 285/253; 24/274 R
(58) Field of Classification Search .............. 285/23, 285/253, 420; 24/274 R
See application file for complete search history.

(56) References Cited

U.S. PATENT DOCUMENTS

| | | | | |
|---|---|---|---|---|
| 3,365,218 A | * | 1/1968 | Denyes ........................ 285/253 |
| 3,407,449 A | * | 10/1968 | Tetzlaff et al. ............... 285/253 |
| 5,388,872 A | * | 2/1995 | Campo et al. ................ 285/253 |
| 5,622,391 A | * | 4/1997 | Belik ............................ 285/23 |
| 5,782,499 A | * | 7/1998 | Gfrerer et al. ................ 285/23 |
| 6,088,886 A | * | 7/2000 | Gyongyosi .................... 24/279 |
| 6,343,772 B1 | * | 2/2002 | Oi ................................ 285/252 |
| 6,398,265 B1 | * | 6/2002 | Sabo ............................. 285/23 |
| 6,530,609 B1 | * | 3/2003 | Chatterton .................... 285/420 |
| 6,773,037 B2 | * | 8/2004 | Spurgat ........................ 285/23 |
| 6,905,145 B2 | * | 6/2005 | Krauss et al. ................. 285/253 |

FOREIGN PATENT DOCUMENTS

JP A04-194486 7/1992

* cited by examiner

*Primary Examiner*—David E Bochna
(74) *Attorney, Agent, or Firm*—Andrus, Sceales, Starke & Sawall, LLP

(57) ABSTRACT

A hose clamp has an annular clamp body to be fitted on a clamp mounting portion of an end portion of a hose, and the clamp body is configured so as to tighten the clamp mounting portion by diametrically contracting the clamp body. A holding structure of the hose clamp has an anti-rotation engaging portion on the clamp body, an engaging holder portion on the hose, and a deformation restraining mechanism for restraining deformation of the hose when the clamp body tightens the clamp mounting portion. The engaging holder portion engages with the anti-rotation engaging portion in a circumferential direction when the clamp body is fitted on the clamp mounting portion. The deformation restraining mechanism restrains that the anti-rotation engaging portion is pressed against the engaging holder portion and thereby the hose is deformed via the engaging holder portion.

4 Claims, 12 Drawing Sheets

HOLDING STRUCTURE OF HOSE CLAMP

BACKGROUND OF THE INVENTION

1. Field of the Invention

The present invention relates to a holding structure of a hose clamp for positioning and holding the hose clamp on an outer periphery of an end portion of a hose. The hose clamp is used, for example, for connection of a fuel hose and a pipe in a motor vehicle.

2. Description of the Related Art

In a fuel piping of a motor vehicle, for example, in order to communicate between pipes, used is a fuel hose made of rubber or elastomer, including a gasoline fuel impermeable layer. A gasoline fuel path is formed between the pipes by fitting each end portion of the fuel hose to an outer periphery of the pipe.

In order to prevent the fuel hose from being detached from the pipe or to prevent leakage of the gasoline fuel at a joint region between the fuel hose and the pipe, the fuel hose is tightly fitted to the outer periphery of the pipe. However, different from the case of a resin tube, sufficient securing strength with respect to the pipe cannot be expected for the fuel hose itself that is made of rubber or elastomer. So, in a connecting structure typically employed, a hose clamp is fitted to an outer periphery of an end portion of the fuel hose, and the fuel hose is tighten and secured to the pipe by the hose clamp.

A hose clamp for firmly securing the fuel hose to the pipe comprises an annular clamp body, and a operating portion for diametrically contracting and expanding the clamp body. The operating portion is, for example, an operation screw. When this hose clamp is used, the clamp body in diametrically expanded state is preparedly fitted on a clamp mounting portion of an end portion of the hose while being positioned in a longitudinal direction of the hose, and then, the fuel hose with the hose clamp is fitted to the pipe. After that, the clamp body is diametrically contracted, for example, by rotating the operation screw with an electric driver or air driver, to tighten the fuel hose to the pipe. In this manner, connecting work may be carried out relatively easily.

Meanwhile, for example, in the hose clamp with an operation screw, it is necessary to rotate the hose clamp on the outer periphery of the end portion of the hose to locate the operation screw in a predetermined circumferential position when the operation screw is rotated, or to hold the hose clamp nonrotationally or irrotationally while the clamp body is diametrically contracted by rotating the operation screw. Thus, basically, connecting work requires both hands. However, in many cases, connecting work of the fuel hose and the pipe is done in a narrow engine compartment where parts are tightly packed and it is not allowed to do connecting work with using both hands freely. So, it bothers considerably an operator to tighten the hose clamp.

As for technique to eliminate such inconvenience, for example, Patent Document 1 discloses a holding structure of a hose clamp where a protrusion protruding in a longitudinal direction of the hose is provided on the clamp body, close to an operation screw, and a cut out portion is formed in an outer periphery of the end portion of the hose for receiving the protrusion. This allows to position the hose clamp in a circumferential direction with respect to the hose.

[Patent Document 1] JP-A, 4-194486

By the way, when the operation screw is rotated to diametrically contract the clamp body, both end portions of the clamp body relatively move in circumferentially opposite directions, and an overlapped region of the both end portions become longer gradually. So, in a holding structure where an anti-rotation engaging portion such as a protruding portion protruding in the longitudinal direction of the hose is formed on the clamp body, when the hose is tightened to the pipe by diametrically contracting the clamp body, the anti-rotation engaging portion tends to move so as to be displaced in the circumferential direction, and, for example, the anti-rotation engaging portion is pressed against a side wall of the cut out portion that receives the anti-rotation engaging portion. And, for example, when the side wall of the cut out portion is pressed firmly by the anti-rotation engaging portion, a portion of the hose or the hose body close to the side wall is deformed in a pressed direction, for example, radially outwardly. So, when the hose is tightened by the hose clamp, it could happen that sufficient sealing property between the hose and the pipe and stopper property of the hose with respect to the pipe cannot be secured. And, there is a fear that a crack caused in the side wall due to that the anti-rotation engaging portion is firmly pressed against the side wall, and thereby the sealing property or the like is lowered at an early stage.

Under the circumstances described above, it is an object of the present invention to provide a holding structure of a hose clamp where the hose clamp can be positioned and held in a circumferential direction with respect to a hose, without fear that securing and connecting property and sealing property between the hose and the pipe are not damaged.

SUMMARY OF THE INVENTION

In order to achieve a foregoing object, according to the present invention, there is provided a novel holding structure of a hose clamp. In the novel holding structure of the hose clamp, the hose clamp has an annular clamp body to be fitted on a clamp mounting portion on an outer periphery of an end portion of a hose, and the clamp body is configured so as to tighten the clamp mounting portion by diametrically contracting the clamp body. The holding structure comprises an anti-rotation engaging portion formed on or in the clamp body, and an engaging holder portion provided on the hose. The engaging holder portion is configured so as to engage with the anti-rotation engaging portion in a circumferential direction when the clamp body is fitted on the clamp mounting portion. The holding structure further comprises a deformation restraining mechanism for restraining deformation of the hose when the clamp body tightens the clamp mounting portion. The deformation restraining mechanism is configured so as to restrain that the anti-rotation engaging portion is pressed against the engaging holder portion and thereby the hose is deformed via the engaging holder portion. A circumferential engagement between the anti-rotation engaging portion formed on or in the clamp body fitted in the clamp mounting portion and the engaging holder portion provided in the hose may position the hose clamp in the circumferential direction with respect to the hose prior to tightening of the hose clamp. And, through the deformation restraining mechanism, it is restrained that when the clamp body tightens or is tightened to the clamp mounting portion by diametrically contracting the clamp body, the anti-rotation engaging potion is pressed against the engaging holder portion, and as a result, for example, the engaging holder portion is deformed and the deformed engaging holder portion causes deformation of the hose. Thus, the hose can be tightened to the pipe without causing a forcible deformation of the hose or the hose body, and further, it can be prevented that a crack is caused in the engaging holder portion. The anti-rotation engaging portion may be provided on or in the clamp body, for example, directly or via other member or portion. The clamp body is constructed, for example, by deforming and forming a band or band shaped member having longitudinally opposite end potions (circumferentially opposite end portions) into an annular shape. When the clamp body is diametrically contracted, the circumferentially opposite end portions (portions toward circumferentially opposite ends) move in circumferentially opposite directions, or relatively move in the circumferentially opposite directions. The anti-rotation engaging portion is formed, for example, on a circumferential end portion of the clamp body. The anti-rotation engaging portion is formed, for example, in the clamp body itself.

In the holding structure of the hose clamp according to the present invention, the hose clamp may have an operation screw for diametrically contracting and expanding the clamp body and the anti-rotation engaging portion provided on or in the clamp body, for example, near the operation screw. The anti-rotation engaging portion may be configured so as to be displaced and moved toward the circumferential direction when the clamp body is diametrically contracted. And, the deformation restraining mechanism may be constructed so as to restrain the anti-rotation engaging portion, which is displaced and moved toward the circumferential direction, from being pressed against the engaging holder portion when the clamp body is diametrically contracted. The deformation restraining mechanism may be provided on or in the engaging holder portion. The operation screw is provided, for example, on a circumferential end portion of the clamp body so as to extend in a tangential direction with respect to the clamp body. When the operation screw is rotated, for example, even if a pressure force is exerted from the electric driver to the operation screw in a tangential direction, the clamp body does not turn around the hose in the circumferential direction. The anti-rotation engaging portion is provided, for example, on a clamp housing that is formed on the clamp body for receiving the operation screw.

When the operation screw is rotated to diametrically contract the clamp body, the anti-rotation engaging portion provided on or in the clamp body is displaced and moved in the circumferential direction. However, as the deformation restraining mechanism is provided, it may be restrained that the anti-rotation engaging portion is pressed against the engaging holder portion so as to cause forcible deformation of the engaging holder portion.

The anti-rotation engaging portion of the clamp body may be in a form of an engaging protruding portion protruding from the clamp body (or with respect to the clamp body) in a longitudinal direction of the hose. The engaging holder portion of the hose may be in a form of an engaging recess (for example, an engaging depression or engaging trough) for receiving the engaging protruding portion, for example, the engaging recess extending in the longitudinal direction of the hose. In order to simplify construction of the deformation restraining mechanism, an upper cut out portion may be formed on a side wall of the engaging recess on a side of the clamp mounting portion. The upper cut out portion may be formed so as to allow the engaging protruding portion to enter (namely to locate) in the upper cutout portion when the engaging protruding portion is displaced and moved toward the circumferential direction as the clamp body is diametrically contracted. Formation of the upper cut out portion lowers a height of the side wall of the engaging recess on a side of the clamp mounting portion. In some case, a portion of the side wall on a side of the clamp mounting portion is entirely cut out to define a flat surface (for example, a surface not raised) by forming the upper cut out portion. The upper cut out portion is, for example, in a form of a lower portion of the side wall (as the case may be, the lower portion of the side wall define a flat surface). Here, since the clamp mounting portion is clamped by the clamp body and deformed, for example, deformed so as to elongate in an axial direction, the engaging protruding portion is moved or relatively moved in a direction out of the engaging recess. Namely, the engaging protruding portion is displaced in the circumferential direction while being moved or relatively moved in the direction or in a longitudinal direction of the hose out of the engaging recess. Or, when the clamp body is diametrically contracted, the engaging protruding portion is moved in the circumferential direction, and the engaging recess is moved or relatively moved so as to be away or apart from the clamp body in the longitudinal direction of the hose. The upper cut out portion is at least formed or defined on the side wall toward the direction that the engaging protruding portion is displaced when the clamp body is diametrically contracted. The engaging recess is provided, for example, on a longitudinally inner end of the hose (a portion opposite an outer end of the hose or an end of the hose) with respect to the clamp mounting portion. The engaging protruding portion is formed, for example, on the clamp body so as to protrude from the clamp body longitudinally inwardly.

In order to secure effective positioning function with simple construction, the clamp mounting portion may be in a form of a positioning groove in which the clamp body is fitted, for example, with a play or allowance in the axial direction. The engaging recess may be formed so as to receive the engaging protruding portion for an entire length thereof or generally for the entire length.

In some case, the hose clamp may be configured so as to provide the clamp body with a support member serving to support the operation screw that is screwed through the support member. The support member is formed, for example, in a plate shape. The support member may be disposed perpendicular to the circumferential direction with respect to the clamp body or a tangential direction with respect to the clamp body. In such arrangement, the support member can be used as anti-rotation engaging portion. So, in the holding structure of the hose clamp according to the present invention, the anti-rotation engaging portion may be in a form of a support member for supporting the operation screw that is screwed through the support member, the engaging holder portion may be in a form of a radial projection formed on the outer periphery (for example, the clamp mounting portion) of the end portion of the hose for abutting the support member, and the deformation restraining mechanism may have such configuration that the radial projection is deformed by the support member that is pressed so as to allow the support member to pass over the radial projection when the support member of the hose clamp or the clamp body is pressed against the radial projection toward the circumferential direction as the clamp body is diametrically contracted. Circumferential engagement between the support member and the radial projection may position the hose clamp not to allow the hose clamp to be displace in one circumferential direction with respect to the hose. Thus, the hose clamp can be positioned in the circumferential direction by providing a positioning mechanism for not allowing the hose clamp to be displaced in the other circumferential direction with respect to the hose. The support member is provided, for example, on a circumferential end portion of the clamp body.

When the operation screw is rotated to diametrically contract the clamp body, the support member provided on the clamp body is moved in the circumferential direction and is pressed against the radial projection formed on the hose. However, since the radial projection is deformed so as to allow the support member to pass over the radial projection when the support member of the clamp body is pressed against the radial projection in the circumferential direction, a forcible deformation is not caused on the hose or the hose body. The support member moves, for example, in one circumferential end with respect to the radial projection, over the radial projection.

Moreover, in the holding structure of the hose clamp according to the present invention, the anti-rotation engaging portion may be in a form of a plurality of engaging holes formed in the clamp body, spaced apart in the circumferential direction, the engaging holder portion may be in a form of a plurality of anti-rotation projections formed on the outer periphery (for example, the clamp mounting portion) of the end portion of the hose for being fitted or fitting in the engaging holes so as to engage with circumferential end portions of the engaging holes in the circumferential direction, respectively, and the deformation restraining mechanism may have such configuration that the circumferential end portions of the engaging holes are displaced in a direction away from the anti-rotation projections when the clamp body is diametrically contracted. The engaging hole may be formed, for example, in a slot or opening that is long in the circumferential direction. The anti-rotation projections engage with the circumferential end portions of the engaging holes or slots, so as to stop the hose clamp against turning movement. And, when the clamp body is diametrically contracted, since the circumferential end portions of the engaging holes are moved in a direction away from the anti-rotation projections, the anti-rotation projections are not allowed to be pressed by the circumferential end portions of the engaging holes. Thus, the anti-rotation projections are not deformed. The clamp body is provided, for example, with a pair of engaging holes, more specifically, arranged across the operation portion (circumferentially opposite end portions of the clamp body). Engaging between one of the engaging holes (the circumferential end portion of the one engaging hole) and one of anti-rotation engaging projections blocks the hose clamp against turning movement in the one circumferential direction. Engagement between the other of the engaging holes (the circumferential end portion of the other engaging hole) and the other of the anti-rotation engaging projections blocks the hose clamp against turning movement in the other circumferential direction. For example, the other engaging hole is formed in the one circumferential end of the clamp body, and the one engaging hole is formed in the other circumferential end of the clamp body.

With the holding structure of the hose clamp according to the present invention, the hose clamp can be positioned and fitted on the hose so as not to be displaced in the circumferential direction until the hose clamp is tightened to the hose. And, tightening of the hose can be completed without causing forcible deformation of the hose or the hose body or without causing a crack in the hose or the hose body.

Now, the preferred embodiments of the present invention will be described in detail with reference to the drawings.

DETAILED DESCRIPTION OF THE PREFERRED EMBODIMENTS

Figure 1:
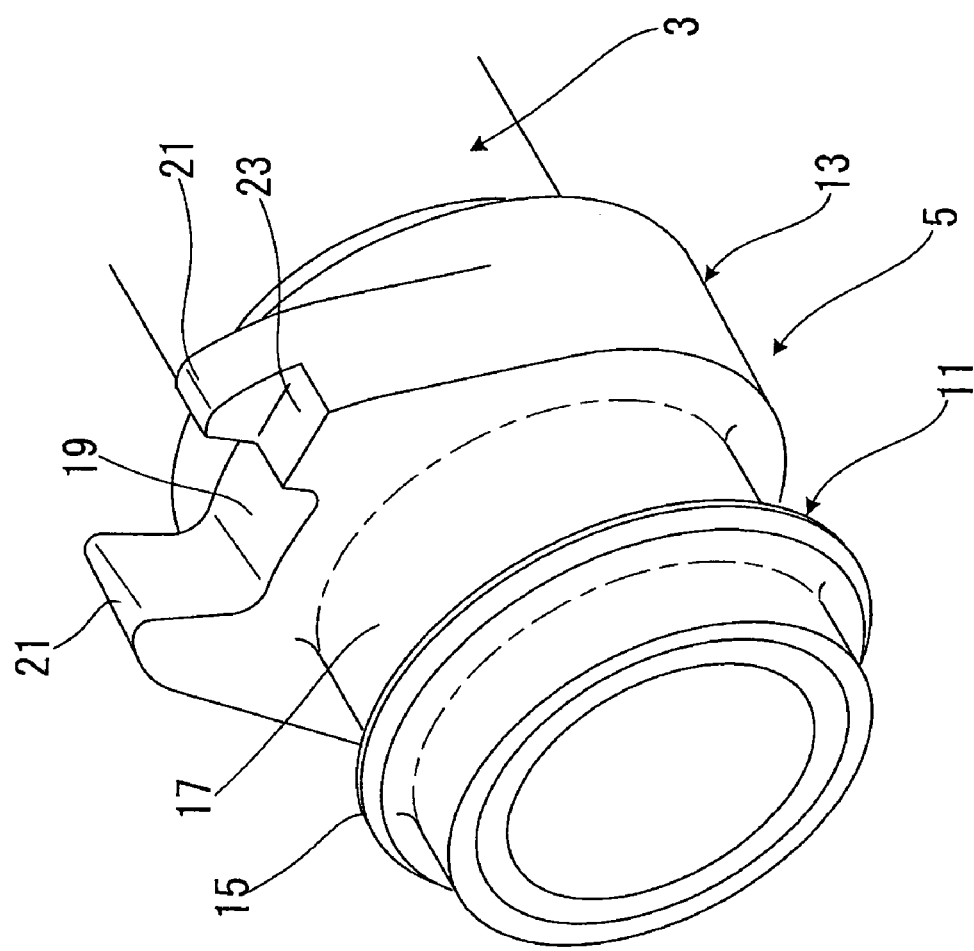
FIG. 1 is a perspective view of a first hose of a first holding structure according to the present invention.
Figure 2:
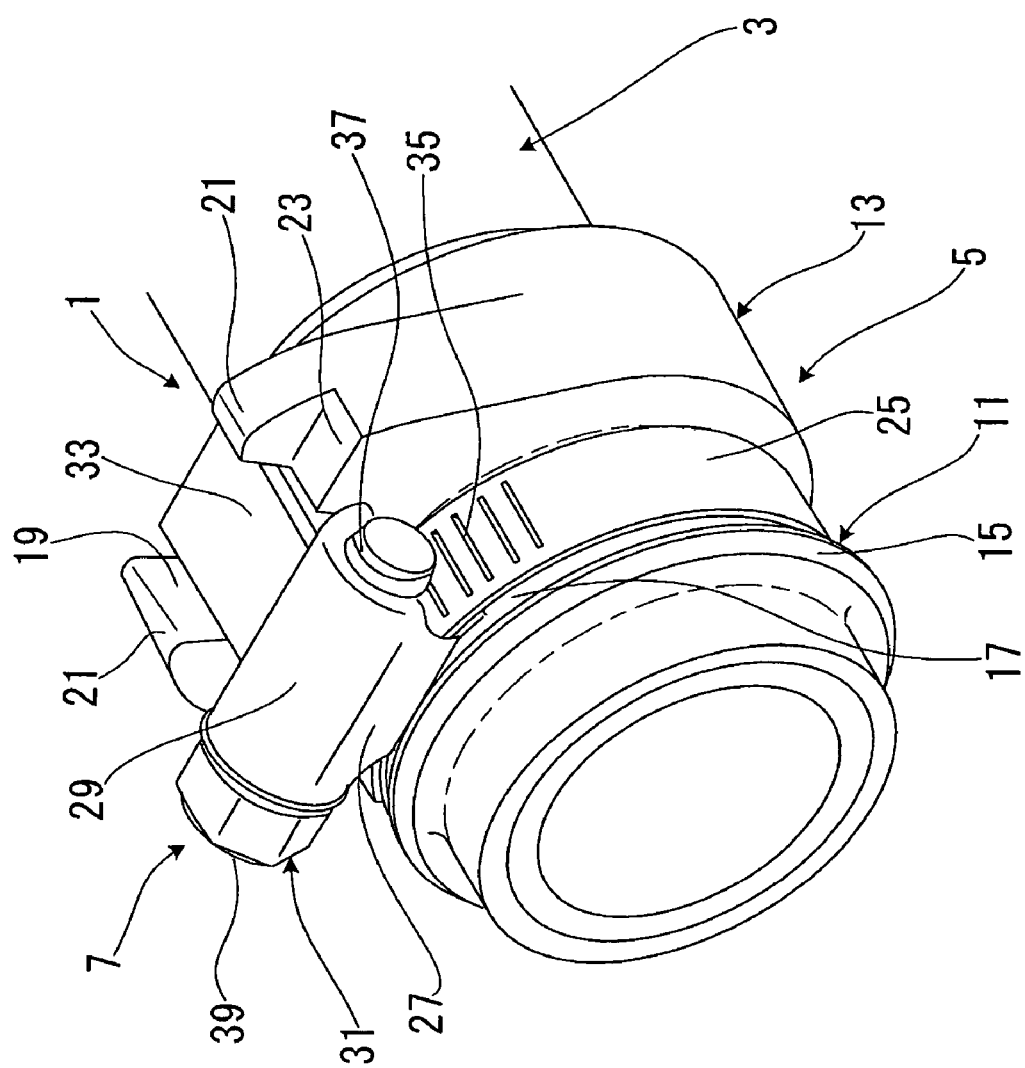
FIG. 2 is a perspective view showing a first hose with clamp where a first hose clamp is fitted on the first hose.

A first hose 1 shown in FIGS. 1 and 2 is adapted for fuel piping around a fuel tank in a motor vehicle. The first hose 1 has a gasoline fuel impermeable hose body 3 and a clamp portion or to-be-clamped portion 5 formed on an outer periphery of an end portion of the hose body 3. The hose body 3 has a multilayered construction, mainly composed of a rubber layer. The clamp portion 5 is made of the same rubber material as an outer layer of the hose body 3, and is provided integrally on the outer periphery of the end portion of the hose body 3. A first hose clamp 7 is mounted on the clamp portion 5 of such first hose 1, and thereby a first hose with clamp 9 is obtained.

The clamp portion 5 of the first hose 1 has a cylindrical portion 11 on a longitudinal outer end thereof, and a large diameter portion 13 on a longitudinal inner end thereof. The cylindrical portion 11 has an annular positioning projection 15 integrally on a longitudinal outer end of an outer peripheral surface thereof. The large diameter portion 13 of the clamp portion 5 has an outer diameter equal to or generally equal to an outer diameter of the annular positioning projection 15. An annular positioning groove (clamp mounting portion) 17 is defined between the large diameter portion 13 and the annular positioning projection 15. A bottom portion of the positioning groove 17 is defined by a longitudinal inner end of an outer peripheral surface of the cylindrical portion 11. The large diameter portion 13 includes an outer peripheral surface which diametrically contracts in a tapered manner toward an outer peripheral surface of the hose body 3 on a longitudinal inner end portion.

The large diameter portion 13 has an engaging recess 19 in an outer peripheral surface of a longitudinal outer end portion thereof, at a predetermined circumferential region thereof. The engaging recess 19 is defined between a pair of raised portions (side walls) 21, 21 that are formed integrally on the outer peripheral surface of the longitudinal outer end portion of the large diameter portion 13, in circumferentially spaced apart from each other. In one of the raised portions 21, an upper end (radially outer end) is cut out on a longitudinal outer end (an end adjacent to or close to the positioning groove 17) so as to reduce its height (radially outward raised length) and define an upper cut out portion 23. An inner surface of the other of the raised portions 21 is inclined at an angle of generally 3° to 5° so as to widen in a longitudinally inward direction (refer to FIG. 3).

In the annular positioning groove 17 of the first hose 1, the first hose clamp 7 is mounted so as to be positioned in a longitudinal direction of the first hose 1. The first hose clamp 7 has a clamp band (clamp body) 25, a band-carrier clamp (clamp housing) 27 provided on one circumferential end portion of the clamp band 25, an operation screw 31 received in a screw receiving portion 29 of the band-carrier clamp 27 and an engaging protruding portion 33 of rectangular shape provided integrally on the band-carrier clamp 27 so as to extend in a direction perpendicular to the operation screw 31. The clamp band 25 is flexible, and is made of metal such as stainless steel. The operation screw 31 is received in the screw receiving portion 29 so as to turn free and extend in a tangential direction with respect to the clamp band 25. The clamp band 25 includes a number of engaging slits 35 extending in a widthwise direction thereof on the other circumferential end portion thereof. The engaging slits 35 are arranged serially in a longitudinal direction of the clamp band 25. The other circumferential end portion of the clamp band 25 is passed through the band-carrier clamp 27 such that the engaging slits 35 engage with a male threaded portion 37 of the operation screw 31. For example, an electric driver or air driver is engaged in a driver slit formed in a head 39 of the operation screw 31, and the operation screw 31 is rotated by the electric driver to allow to adjust a length of the other circumferential end portion of the clamp band 25 relatively passing through the band-carrier clamp 27, thereby to adjust a diameter of the clamp band 25. The band-carrier clamp 27 may be regarded, for example, as a part of the clamp band 25.

The first hose clamp 7 is mounted on the clamp portion 5 of the first hose 1 so that the clamp band 25 in a diametrically expanded state seats in the annular positioning groove 17 while the engaging protruding portion 33 is received in the engaging recess 19, the head 39 of the operation screw 31 is located adjacent to or near the other raised portion 21 that does not include the upper cut out portion 23. In this manner, a first hose with clamp 9 is constructed. Since a width of the annular positioning groove 17 is slightly longer than a width of the clamp band 25, the clamp band 25 seats in the annular positioning groove 17 with a clearance in the longitudinal direction of the hose 1. And, since a width of the engaging protruding portion 33 is slightly shorter than a width (width of a narrowest portion) of the engaging recess 19, the engaging protruding portion 33 is received in the engaging recess 19 with a clearance in a circumferential direction.

Figure 3:
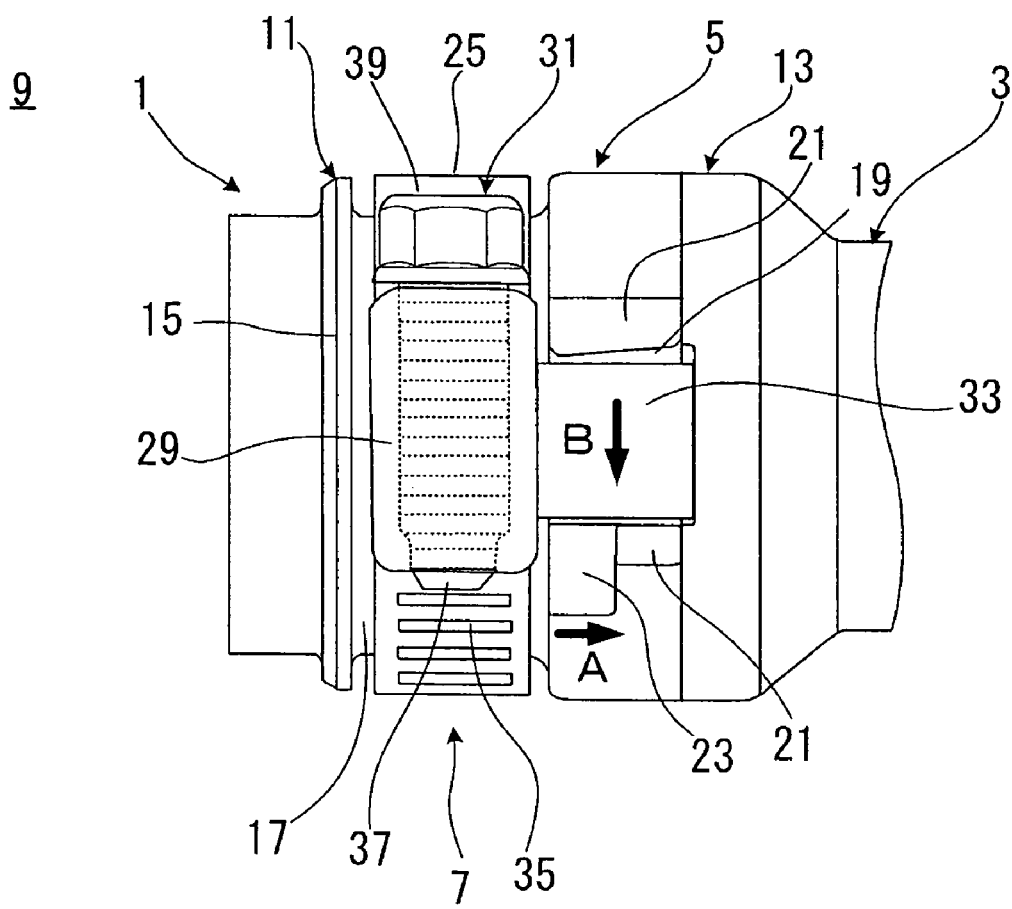
FIG. 3 is a view showing a state of the first hose clamp before the first hose clamp is tightened to the first hose.
Figure 4:
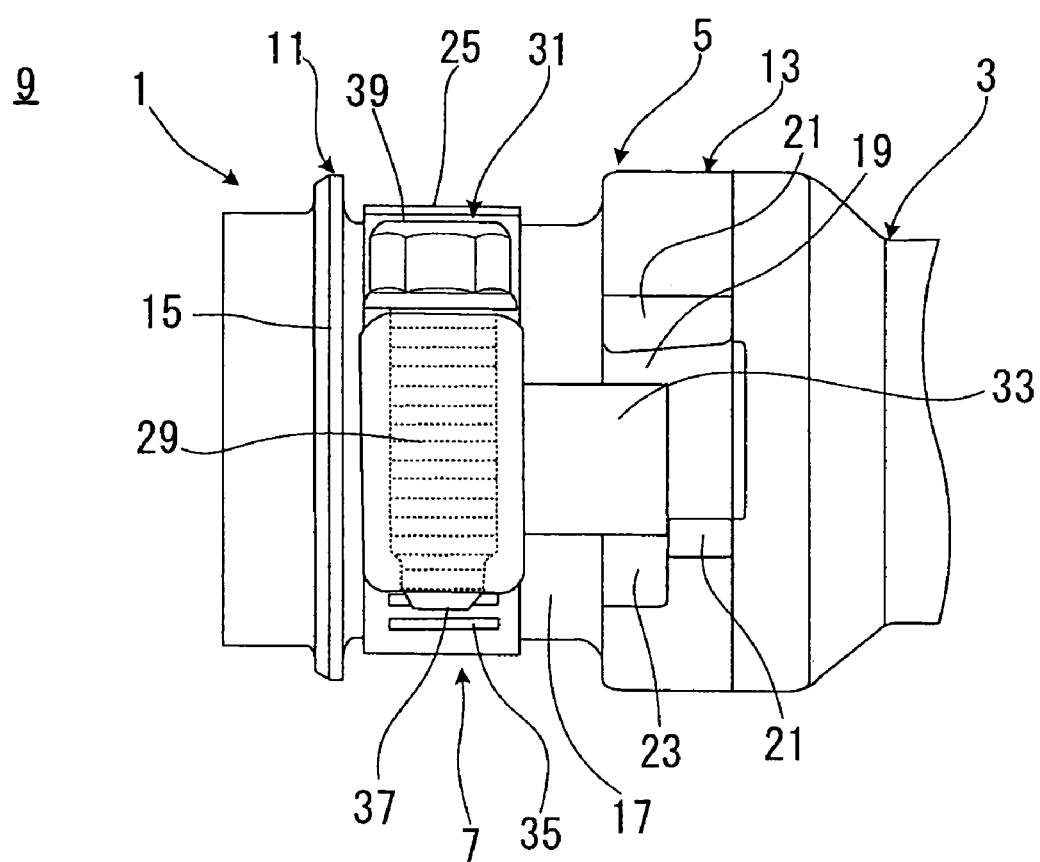
FIG. 4 is a view showing a state of the first hose clamp when the first hose clamp is tightened to the first hose.

As well shown in FIGS. 3 and 4, the first hose clamp 7 is mounted on the clamp portion 5 of the first hose 1 while the clamp band 25 seats in the annular positioning groove 17 and the engaging protruding portion 33 is received in the engaging recess 19. Thus, the first hose clamp 7 is not allowed to be displaced in the longitudinal direction of the hose 1 or the circumferential direction of the hose 1 until the first hose 1 is fitted to a pipe and afterwards (refer to FIG. 2). Then, the first hose 1 is fitted to the pipe, and the clamp band 25 is diametrically contracted by rotating the operation screw 31 of the first hose clamp 7. At that time, the annular positioning groove 17 is tightened by the clamp band 25 and gets slightly longer in the longitudinal direction. And, the large diameter portion 13 (the engaging recess 19) is displaced or relatively displaced so as to move in a direction or longitudinal direction away from the clamp band 25, or the clamp band 25 and the engaging protruding portion 33 are displaced or relatively displaced so as to move in a direction or longitudinal direction away from the large diameter portion 13 (the engaging recess 19), and a leading end of the engaging protruding portion 33 moves or relatively moves toward the upper cut out portion 23 (refer to an arrow A in FIG. 3). As the clamp band 25 is diametrically contracted, the band-carrier clamp 27, thus the engaging protruding portion 33 moves toward the one raised portion 21 including the upper cut out portion 23 (refer to an arrow B in FIG. 3). So, when the first hose clamp 7 is tightened, the engaging protruding portion 33 moves or relatively moves, or is located or relatively located so as to seat in the upper cut out portion 23 (FIG. 4). Meanwhile, in FIG. 4, for sake of convenience in explanation, a deformed state of the first hose 1 is illustrated adjusted to facilitate better understanding.

Figure 5:
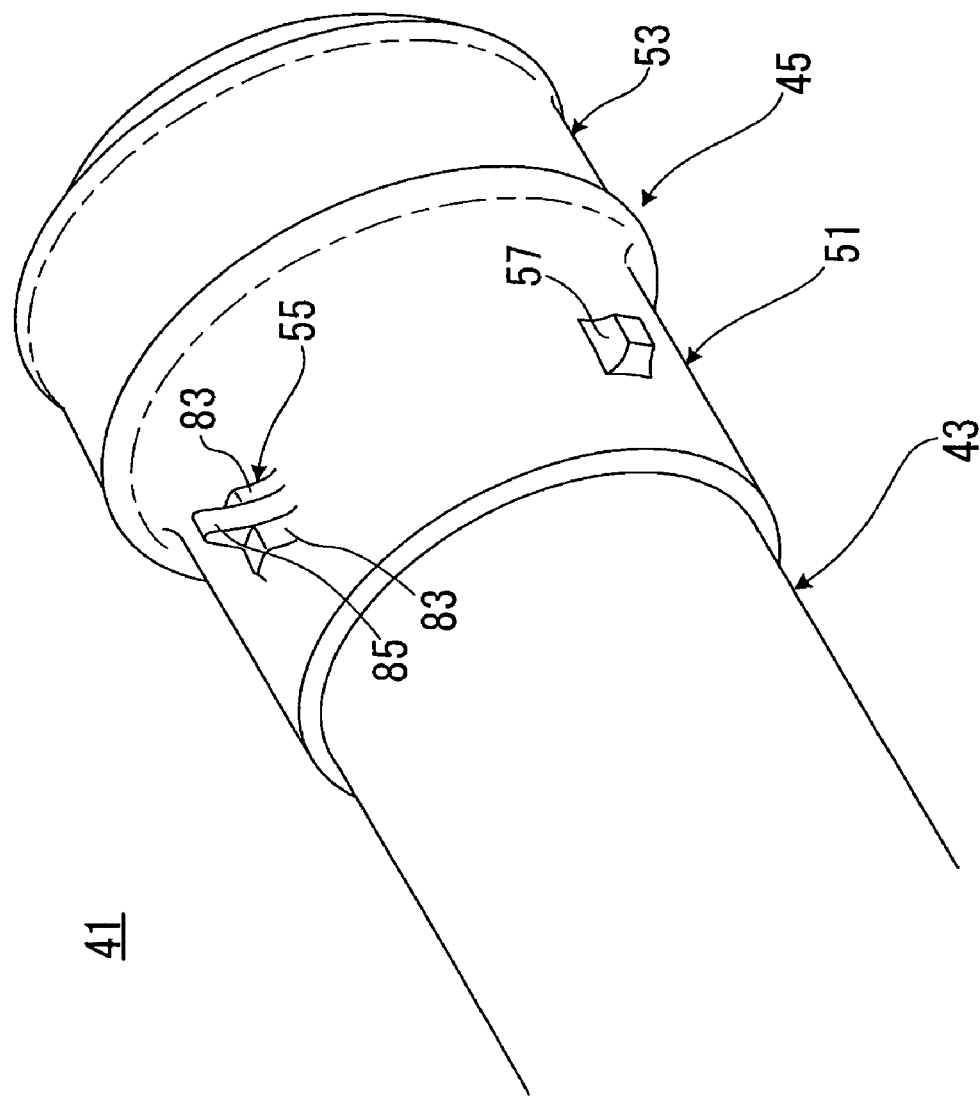
FIG. 5 is a perspective view of a second hose of a second holding structure according to the present invention.
Figure 6:
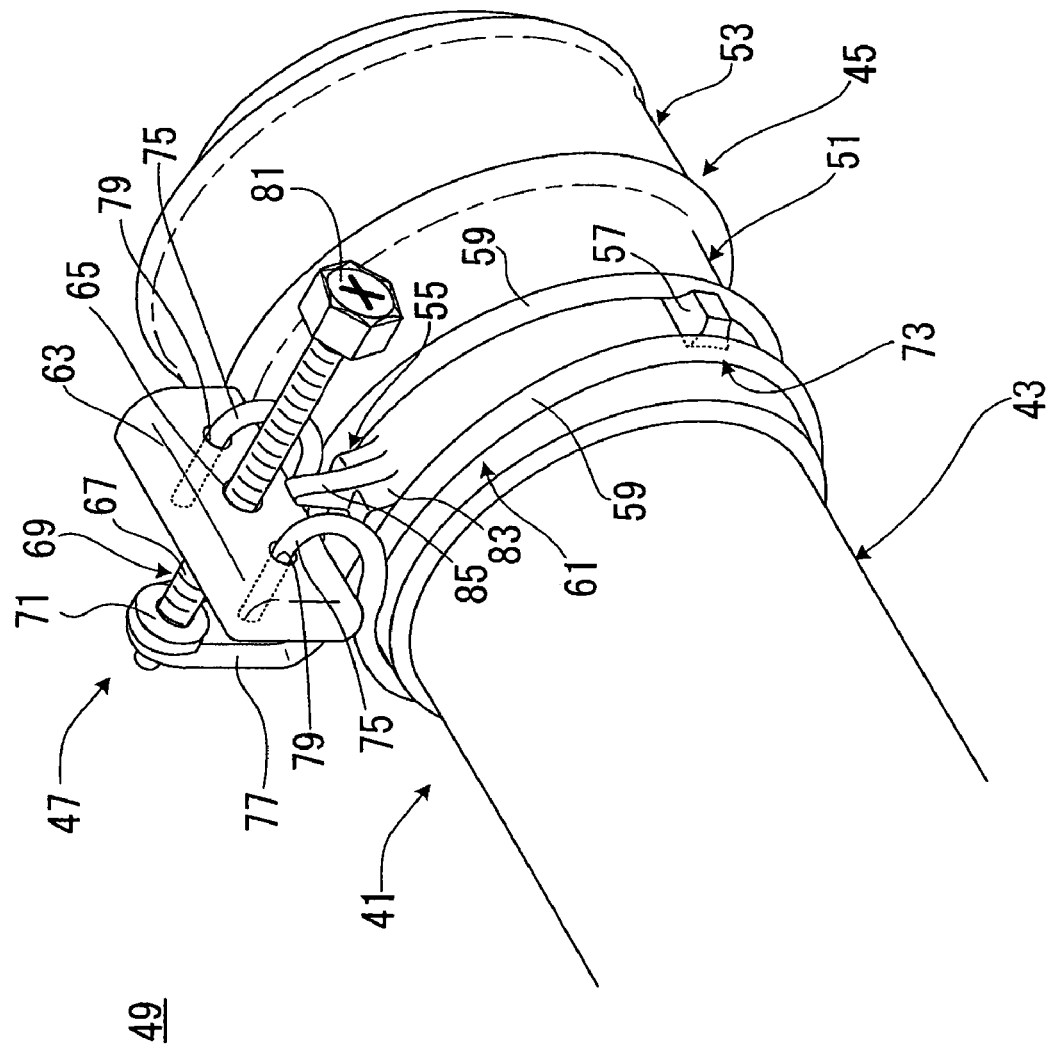
FIG. 6 is a perspective view showing a second hose with clamp where a second hose clamp is fitted on the second hose.

Now, with reference to FIGS. 5 and 6, shown is a second hose 41, which is used also for fuel piping around a fuel tank in a motor vehicle. The second hose 41 has a gasoline fuel impermeable hose body 43 and a clamp portion or to-be-clamped portion 45 formed on an outer periphery of an end portion of the hose body 43. The hose body 43 has a multi-layered construction, mainly composed of a rubber layer. The clamp portion 45 is made of the same rubber material as an outer layer of the hose body 43, and provided integrally on the outer periphery of the end portion of the hose body 43. A second hose clamp 47 is mounted on the clamp portion 45 of such second hose 41, and thereby a second hose with clamp 49 is obtained.

The clamp portion 45 of the second hose 41 has a cylindrical portion 51 on a longitudinal inner end thereof, and a large diameter portion 53 on a longitudinal outer end thereof. The cylindrical portion 51 integrally has a radial projection 55 made of rubber at a predetermined circumferential region on an outer peripheral surface of a longitudinal center thereof, and another radial projection 57 made of rubber on the outer peripheral surface thereof, spaced circumferentially from the radial projection 55, and thereby a clamp mounting portion is constituted.

As shown in FIG. 6, the second hose clamp 47 is mounted on an outer peripheral surface of a longitudinal center of the cylindrical portion 51. The second hose clamp 47 has a flexible metal wire clamp (clamp body, band shaped body) 61, a rectangular shaped, metal support lug or plate (support member) 63 provided on one circumferential end portion of the wire clamp 61, an operation screw 69 including a male-threaded portion 67 and a screw receiver 71 that is supported on the other circumferential end portion of the wire clamp 61 located so as to intersect with the one circumferential end portion of the wire clamp 61 in the circumferential direction. The wire clamp 61 includes a pair of wires 59, 59. The operation screw 69 is screwed into a threaded bore 65 of the support lug 63 and is arranged so as to extend in a tangential direction with respect to the wire clamp 61. The male threaded portion 67 includes a non-threaded portion on a leading end thereof. The screw receiver 71 is fitted on the non-threaded portion rotatably, and engages with the male threaded portion 67 in a direction of an axis of the male threaded portion 67. The pair of wires 59, 59 are slightly curved inwardly on circumferential middle portions thereof, respectively, so as to constitute a positioning portion 73 with narrow width. The operation screw 69 is supported in the screw receiver 71 rotatably.

Here, the wire clamp 61 is configured by single wire member 59. The single wire member 59 is folded at a longitudinal center thereof. Opposite end portions 75, 75 and a folded portion 77 of the wire member 59 are intersected each other along the circumferential direction to form the wire member 59 in an annular shaped or ring shaped body. The support lug 63 is retained on one circumferential end portion of the wire clamp 61 in such state that the opposite end portions 75, 75 of the wire member 59 folded back are inserted through support holes 79, 79. The screw receiver 71 is held on the other circumferential end portion of the wire clamp 61 by being pressed against the folded portion 77 of the wire member 59. At a region around an intersection between the opposite end portions 75, 75 and the folded portion 77, a side of the folded portion 77 is located on an inside between a side of the opposite end portions 75, 75.

The support lug 63 and the screw receiver 71 are biased by the wire clamp 61 so as to narrow the distance therebetween, in a state as shown in FIG. 6. A distance between the support lug 63 and the screw receiver 71 may be adjusted, for example, by engaging the electric driver in a driver slot on a head 81 of the operation screw 69 and rotating the operation screw 69 by the electric driver, and thus the wire clamp 61 can be diametrically contracted or expanded.

The second hose clamp 47 is mounted on the clamp portion 45 of the second hose 41 so that the positioning portion 73 of the wire clamp 61 in a diametrically expanded state clips the radial projection 57 provided on the clamp portion 45 of the second hose 41 from both sides thereof, the radial projection 55 is located circumferentially outward (one circumferential end) with respect to the support lug 63, the support lug 63 engages with the radial projection 55 in one circumferential direction, and a leading end of the male threaded portion 67 of the operation screw 69 extends in a direction opposed to the radial projection 55 with respect to the support lug 63. In this manner, a second hose with clamp 49 is constructed.

Figure 7:
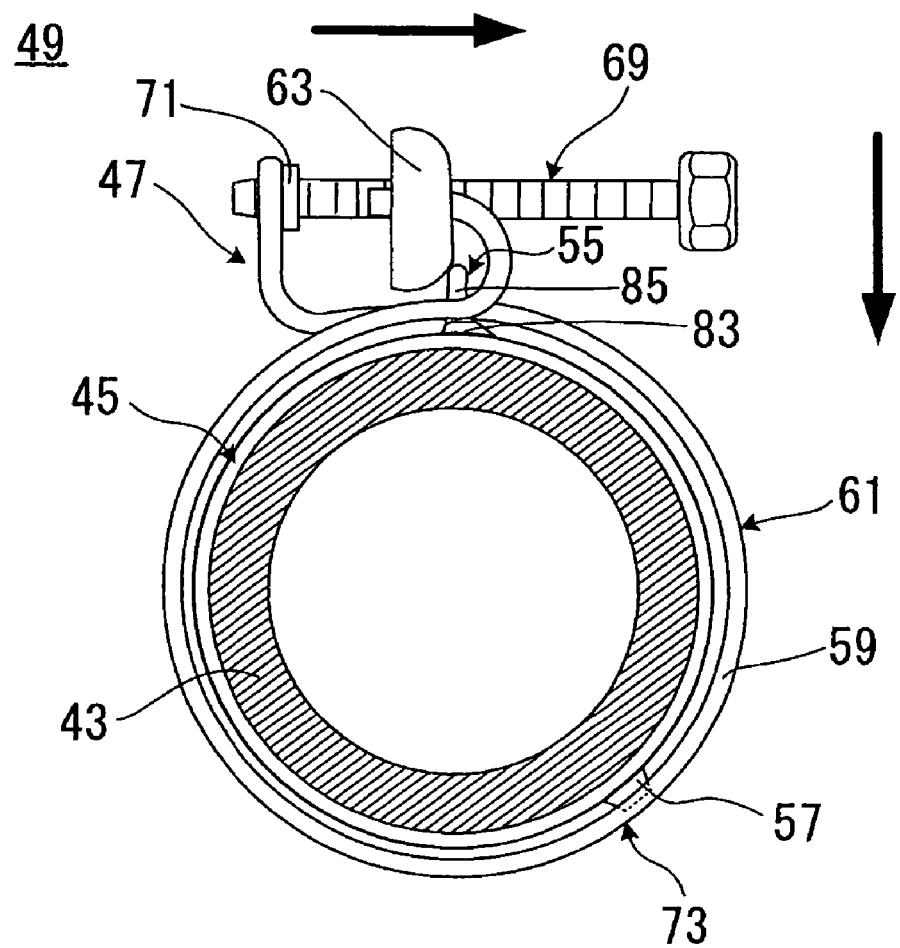
FIG. 7 is a view showing a state of the second hose clamp before the second hose clamp is tightened to the second hose.
Figure 8:
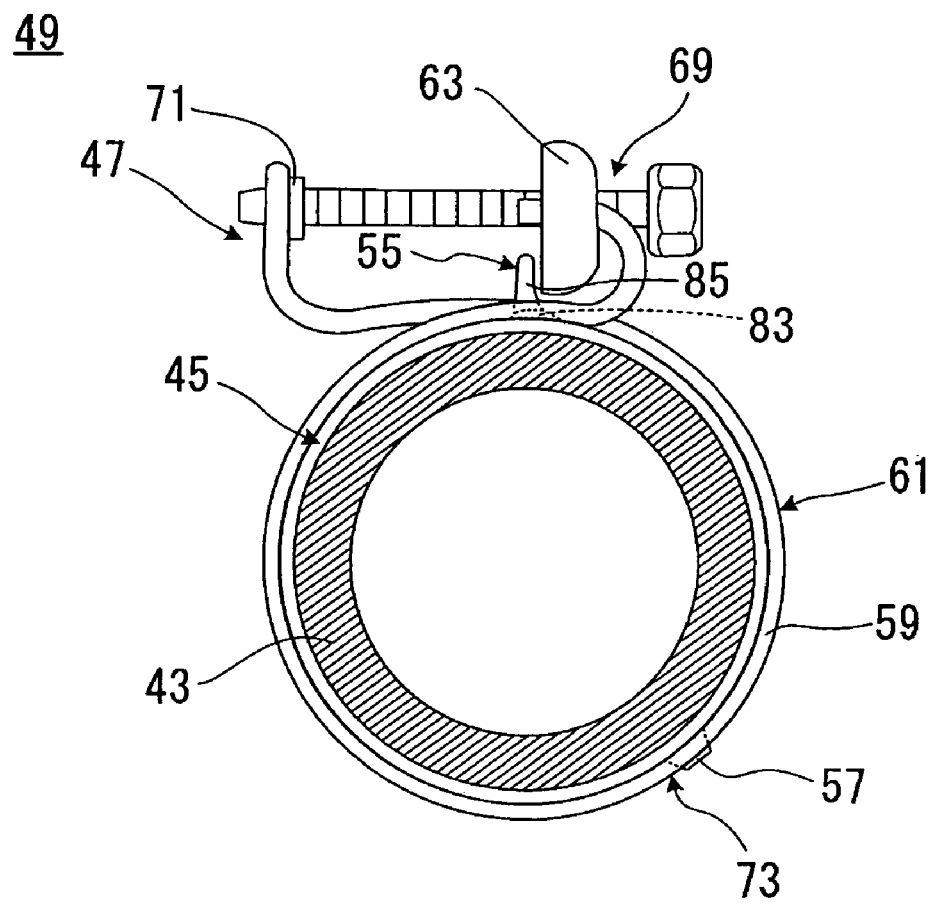
FIG. 8 is a view showing a state of the second hose clamp when the second hose clamp is tightened to the second hose.

With reference to FIGS. 7 and 8, the second hose clamp 47 is mounted on the clamp portion 45 of the second hose 41 in such manner that the positioning portion 73 clips the radial projection 57 from both sides thereof, and the support lug 63 engages with the radial projection 55 in the one circumferential direction. The radial projection 57 is preferably shaped so as to be tapered radially outward for facilitating fitting of the wire clamp 61 or shaped so as to follow a sectional shape of the wire 59 for facilitating holding the wire clamp 61. Here, the radial projection 57 is formed in a frusto-pyramid shape, and its base end portion has a width generally equal to a distance between the pair of wires 59, 59 (at a portion except for the positioning portion 73). The radial projection 57 is clipped in the positioning portion 73, thereby the second hose clamp 47 is positioned in the circumferential direction, and the radial projection 57 engages with the pair of wires 59, 59 in the longitudinal direction of the hose 41. Further, a base portion 83 of the radial projection 55 has a width generally equal to a distance between the pair of wire 59, 59 and seats between the pair of wires 59, 59 in engaging relation in the longitudinal direction of the hose 41. Here, the radial projection 55 serves as positioning portion or positioner in the one circumferential direction by engaging with the support lug 63 in the circumferential direction. However, this is, for example, regarded to help positioning in the circumferential direction by engagement between the radial projection 57 and the positioning portion 73. Thus, the second hose clamp 47 is not allowed to be displaced in the longitudinal direction or the circumferential direction of the hose 41 until the second hose 41 is fitted to a pipe and afterwards (refer to FIG. 6). And, when the second hose 41 is fitted to the pipe, and the wire clamp 61 is diametrically contracted by rotating the operation screw 69 of the second hose clamp 47, the support lug 63 is displaced in a direction indicated by a downward arrow in FIG. 7 while moving in a direction indicated by a right-pointing arrow in FIG. 7, and is pressed against the radial projection 55. The radial projection 55 has a wide base portion 83, and a narrow engaging deforming portion 85 provided on a widthwise middle portion of the base portion 83. The narrow engaging deforming portion 85 projects more radially outwardly than the base portion 83. The support lug 63 is pressed against the narrow engaging deforming portion 85. Thus, the operation screw 69 is further rotated, the support lug 63 deforms the engaging deforming portion 85 to pass over the engaging deforming portion 85 in the one circumferential direction, and the second hose 41 is tightened to the pipe (refer to FIG. 8). Namely, the engaging deforming portion 85 is, for example, made of rubber, and has a sufficient hardness to engage with the support lug 63 for positioning the support lug 63 in the circumferential direction. However, the engaging deforming portion 85 has a flexibility to deform so as to allow the support lug 63 to pass over the engaging deforming portion 85 when the support lug 63 is pressed against the engaging deforming portion 85 by rotating the operation screw 69, and to return to its original shape or state after the support lug 63 passes over the engaging deforming portion 85.

Figure 9:
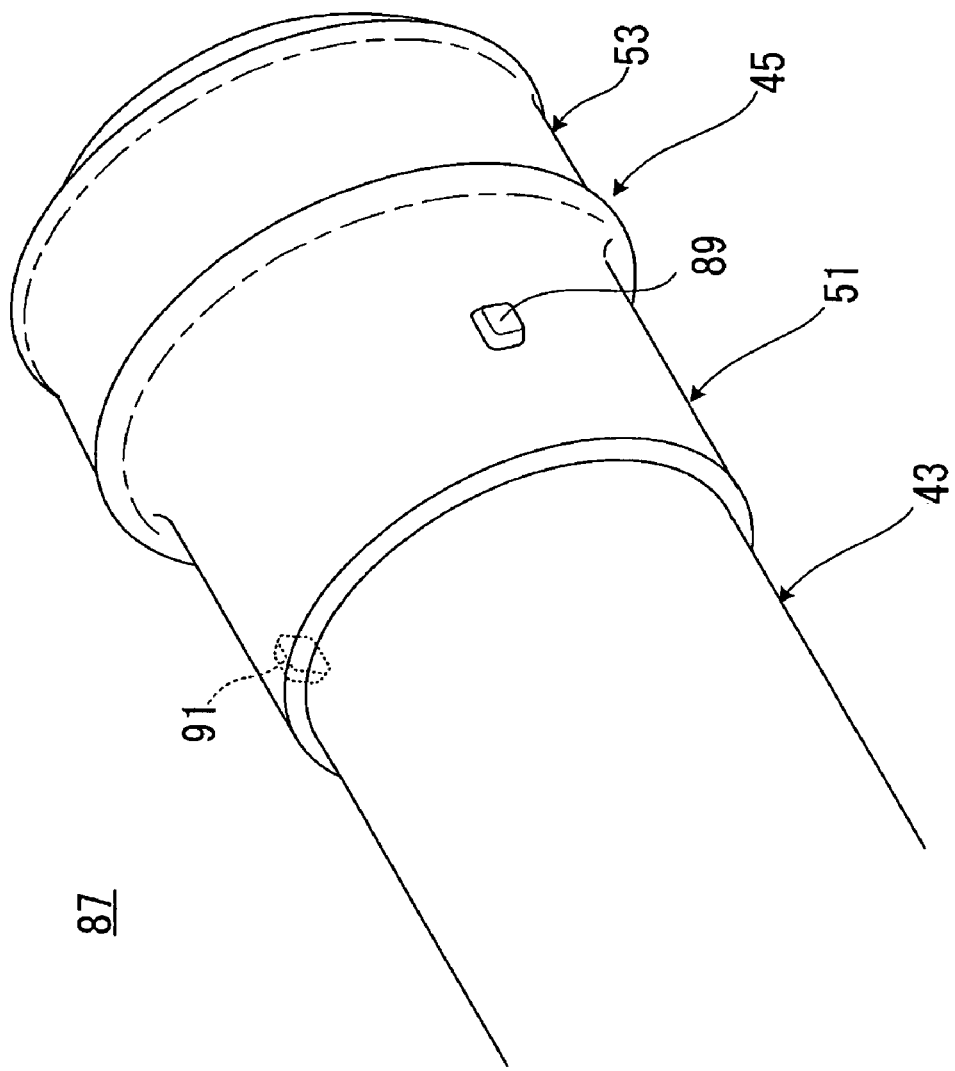
FIG. 9 is a perspective view of a third hose of a third holding structure according to the present invention.
Figure 10:
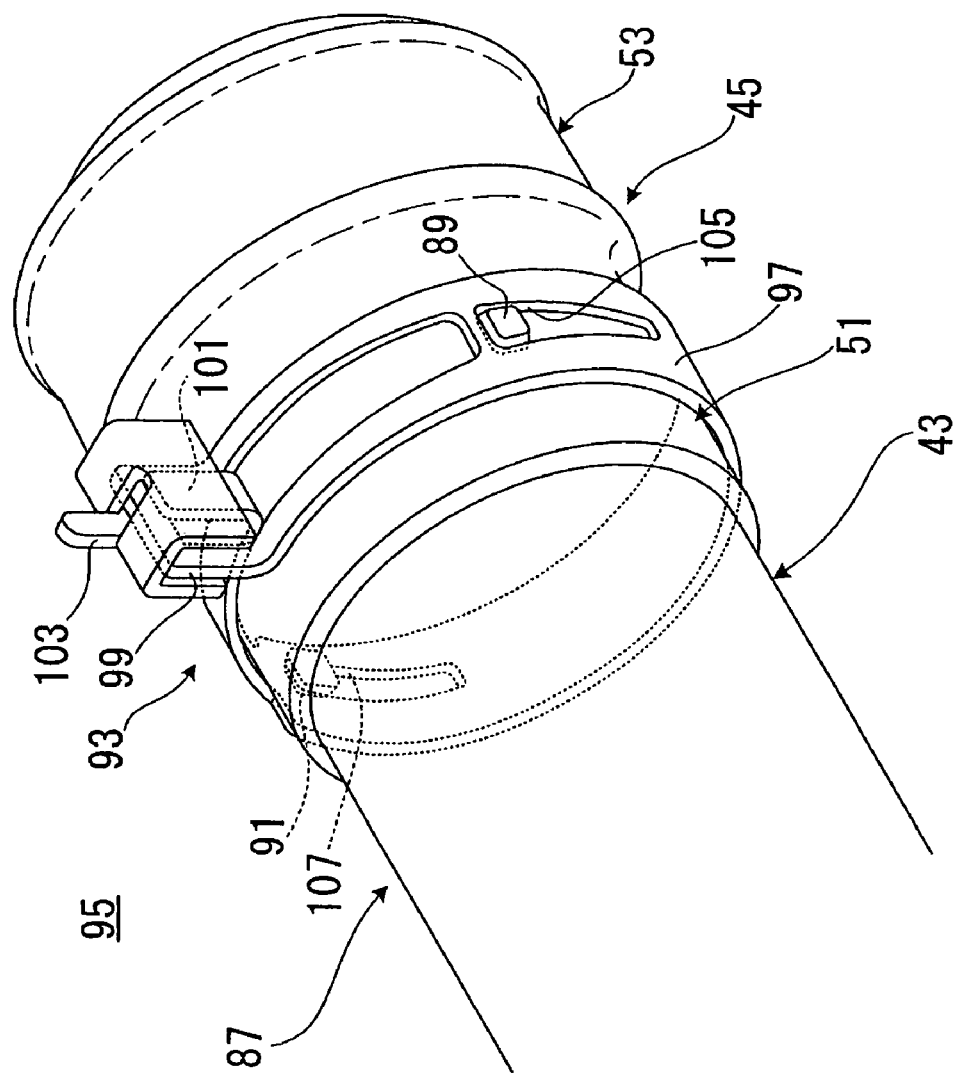
FIG. 10 is a perspective view showing a third hose with clamp where a third hose clamp is fitted on the third hose.

With reference to FIGS. 9 and 10, a third hose 87 is provided integrally with two anti-rotation projections that are substituted for the radial projection 55 and the radial projection 57 of the second hose 41 (circumferential positions of the anti-rotation projections are not always identical to those of the radial projection 55 and the radial projection 57). Other configuration is the same as the second hose 41, generally, identical elements to the second hose 41 are indicated with identical reference numerals. Therefore, a redundant explanation of the elements will be basically omitted.

The clamp portion 45 of the third hose 87 has a cylindrical portion 51 on a longitudinal inner end thereof, and a large diameter portion 53 on a longitudinal outer end thereof. The cylindrical portion 51 has two anti-rotation projections 89, 91, made of rubber, integrally on an outer peripheral surface of a longitudinal center thereof, circumferentially spaced apart from one another and thereby a clamp mounting portion is configured. A third hose clamp 93 is mounted on such clamp portion 45 of the third hose 87, and thereby a third hose with clamp 95 is obtained.

As well shown in FIG. 10, the third hose clamp 93 integrally has a flexible (resiliently flexible) metal clamp band (clamp body) 97 shaped of annular strip, and operating portions 99, 101 formed on circumferentially opposite end portions of the clamp band 97 so as to be bent radially outwardly, respectively. The clamp band 97 includes one circumferential end formed with narrow width, and the other circumferential end that is bifurcated. The third hose clamp 93 is, in its basic form, diametrically contracted with one circumferential end portion intersecting with the other circumferential end portion in the circumferential direction and entering therein. The third hose clamp 93 is retained in a diametrically expanded state with clipping the operating portion 99, 101 by a retaining member 103 in unitary relation. The clamp band 97 of the third hose clamp 93 has two engaging slits 105, 107 that are long in the circumferential direction, on either circumferential side of the operating portions 99, 101.

Figure 11:
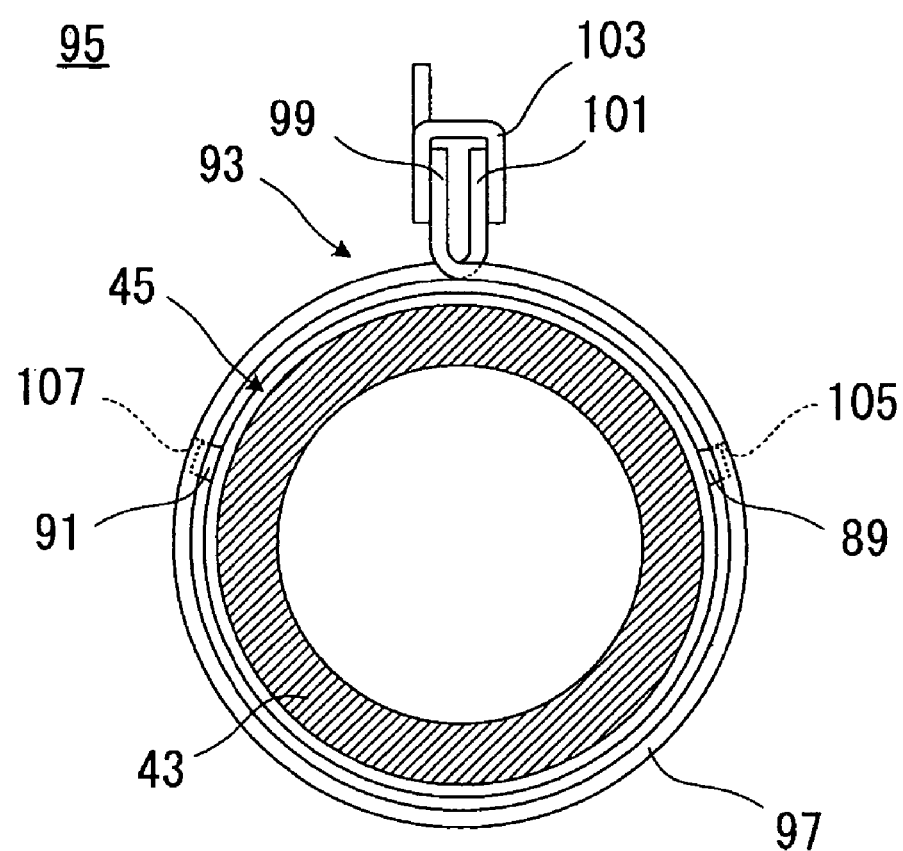
FIG. 11 is a view showing a state of the third hose clamp before the third hose clamp is tightened to the third hose.
Figure 12:
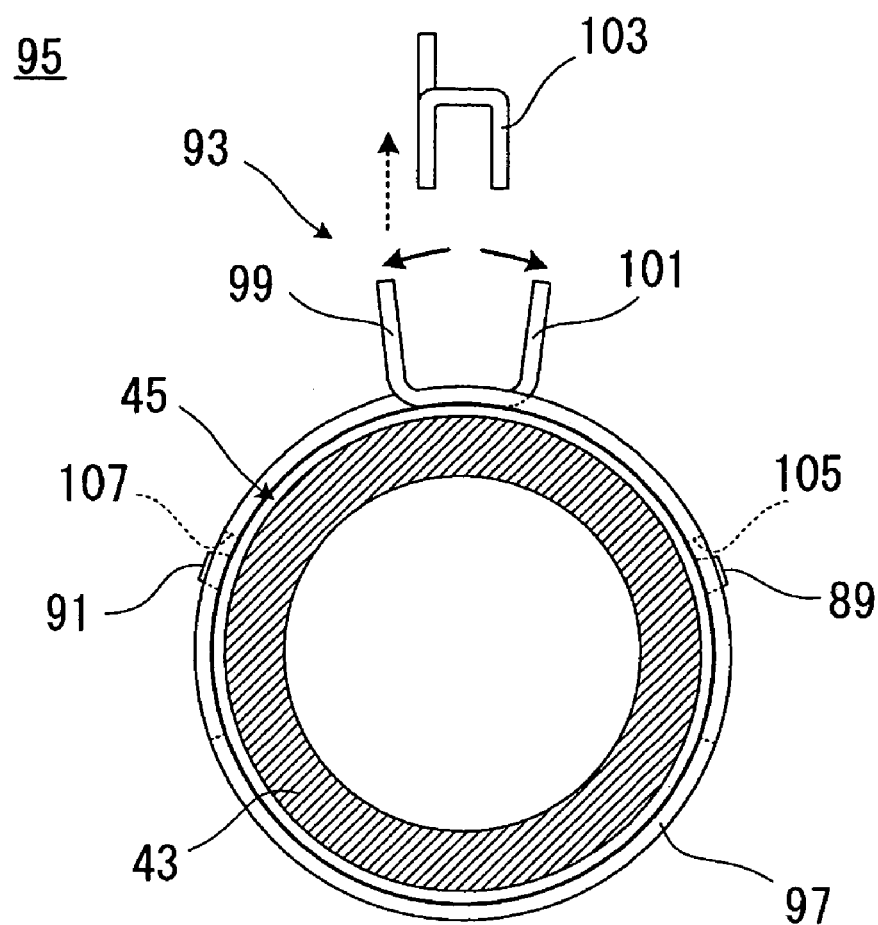
FIG. 12 is a view showing a state of the third hose clamp when the third hose clamp is tightened to the third hose.

The third hose clamp 93 is mounted on the clamp portion 45 of the third hose 87 such that two anti-rotation projections 89, 91 enter in the engaging slots 105, 107 so as to engage circumferential end portions of the engaging slots 105, 107 near the operating portions 99, 101, in the circumferential direction, respectively (also refer to FIG. 11). Namely, one circumferential end portion of the engaging slot 107 on one circumferential end (near one circumferential end) engages the anti-rotation projection 91, while the other circumferential end portion of the engaging slot 105 on the other circumferential end (near the other circumferential end) engages with the anti-rotation projection 89. In the third hose clamp 93, engagement between the engaging slot 105 (the end portion near the operating portion 99) and the anti-rotation projection 89 restrains movement in one circumferential direction, and engagement between the engaging slot 107 (the end portion near the operating portion 101) and the anti-rotation projection 91 restrains movement in the other circumferential direction. And, the anti-rotation projections 89, 91 engage the engaging slots 105, 107 also in the longitudinal direction. Thus, the third hose clamp 93 is not allowed to be displaced in the longitudinal direction or the circumferential direction of the hose 87 until the third hose 87 is fitted to a pipe and afterwards (refer to FIG. 10). And, when the third hose 87 is fitted to the pipe and the retaining member 103 is removed from the operating portions 99, 101, the clamp band 97 returns to a diametrically contracted state under its spring back force, and tightens the third hose 87 to the pipe. At the time when the clamp band 97 returns to the diametrically contracted state, the circumferential end portions of the engaging slots 105, 107 move away from the anti-rotation projections 89, 91 in a direction of canceling engagement, respectively. The anti-rotation projections 89, 91 are located in middle portions circumferentially of engaging slots 105, 107, and thus improper deformation is not caused on regions of the anti-rotation projections 89, 91 (refer to FIG. 12).

The holding structure of the hose clamp according to the present invention, allows to easily connect a hose to a pipe in a small area such as around a fuel tank without exerting an improper deformation to the hose.

What is claimed is:

1. A holding structure of a hose clamp wherein the hose clamp has an annular clamp body to be fitted on a clamp mounting portion on an outer periphery of an end portion of a hose, and the clamp body is configured so as to tighten the clamp mounting portion by diametrically contracting the clamp body, the holding structure, comprising:

an anti-rotation engaging portion formed on or in the clamp body, an engaging holder portion provided on the hose, the engaging holder portion engaging with the anti-rotation engaging portion in a circumferential direction when the clamp body is fitted on the clamp mounting portion, and a deformation restraining mechanism for restraining deformation of the hose when the clamp body tightens the clamp mounting portion, the deformation restraining mechanism being configured so as to restrain the anti-rotation engaging portion from being pressed against the engaging holder portion and thereby restrain the hose from being deformed via the engaging holder portion;

wherein the hose clamp has an operation screw for diametrically contracting and diametrically expanding the clamp body, the anti-rotation engaging portion is configured so as to be displaced and moved toward the circumferential direction when the clamp body is diametrically contracted, and the deformation restraining mechanism is provided in the engaging holder portion for restraining the anti-rotation engaging portion from being pressed against the engaging holder portion when the clamp body is diametrically contracted, the anti-rotation engaging portion is displaced and moved toward the circumferential direction.

2. The holding structure of the hose clamp as set forth in claim 1, wherein the anti-rotation engaging portion is in a form of a support member for supporting the operation screw that is screwed through the support member, the engaging holder portion is in a form of a radial projection formed on the outer periphery of the end portion of the hose for abutting the support member, and the deformation restraining mechanism has such configuration that the radial projection is deformed by the support member that is pressed so as to allow the support member to pass over the radial projection when the support member of the clamp body is pressed against the radial projection toward the circumferential direction as the clamp body is diametrically contracted.

3. A holding structure of a hose clamp wherein the hose clamp has an annular clamp body to be fitted on a clamp mounting portion on an outer periphery of an end portion of a hose, and the clamp body is configured so as to tighten the clamp mounting portion by diametrically contracting the clamp body, the holding structure, comprising:

an anti-rotation engaging portion formed on or in the clamp body, an engaging holder portion provided on the hose, the engaging holder portion engaging with the anti-rotation engaging portion in a circumferential direction when the clamp body is fitted on the clamp mounting portion, and a deformation restraining mechanism for restraining deformation of the hose when the clamp body tightens the clamp mounting portion, the deformation restraining mechanism being configured so as to restrain the anti-rotation engaging portion from being pressed against the engaging holder portion and thereby restrain the hose from being deformed via the engaging holder portion;

wherein the anti-rotation engaging portion is in a form of an engaging protruding portion protruding from the clamp body in a longitudinal direction of the hose, the engaging holder portion is in a form of an engaging recess for receiving the engaging protruding portion, the deformation restraining mechanism is in a form of an upper cut out portion formed on a side wall of the engaging recess on a side of the clamp mounting portion, the upper cut out portion allows the engaging protruding portion to enter in the upper cutout portion when the engaging protruding portion is displaced and moved toward the circumferential direction as the clamp body is diametrically contracted.

4. The holding structure of the hose clamp as set forth in claim 3, wherein the clamp mounting portion formed in the outer periphery of the end portion of the hose is in a form of a positioning groove in which the clamp body is fitted, and the engaging recess is formed so as to receive the engaging protruding portion generally for an entire length thereof.

* * * * *